(12) United States Patent  (10) Patent No.: US 8,122,221 B2
Hanscom  (45) Date of Patent: Feb. 21, 2012

(54) METHOD AND APPARATUS TO COMBINE SCATTERED BUFFER ADDRESSES INTO A CONTIGUOUS VIRTUAL ADDRESS SPACE

(75) Inventor: Jeffrey C. Hanscom, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 12/036,403

(22) Filed: Feb. 25, 2008

(65) Prior Publication Data

US 2009/0216991 A1  Aug. 27, 2009

(51) Int. Cl.
*G06F 12/00* (2006.01)
(52) U.S. Cl. .................. 711/203; 711/E12.001
(58) Field of Classification Search .......... None
See application file for complete search history.

(56) References Cited

U.S. PATENT DOCUMENTS

| | | | |
|---|---|---|---|
| 7,000,041 B2 | 2/2006 | Creta et al. | |
| 7,228,362 B2 * | 6/2007 | Jen et al. | 710/6 |
| 2005/0204185 A1 * | 9/2005 | Tait et al. | 714/5 |
| 2005/0238038 A1 | 10/2005 | Keller et al. | |
| 2008/0263307 A1 * | 10/2008 | Adachi | 711/171 |

OTHER PUBLICATIONS z/Architecture Principles of Operation, International Business Machines Corporation, SA22-7832-05, Sixth Edition (Apr. 2007) Downloaded as 4 separate attachments due to large size. 1,215 pages total.

* cited by examiner

*Primary Examiner* — Hetul Patel
(74) *Attorney, Agent, or Firm* — Cantor Colburn LLP; Steve Chiu

(57) ABSTRACT

A method of combining scattered buffer addresses into a contiguous virtual address space comprises; receiving a plurality of read completion data portions corresponding to a single read request, storing the plurality of read completion data portions in a memory device such that an individual read completion data portion is stored in an individual address of the memory device, storing a valid indicator for a memory device address which contains the individual read completion data portion in an external storage location, storing a tag indicator associated with the read request for the individual read completion portion in an external storage location associated with the memory device address containing the individual read completion data portion, storing a sequence number associated with an individual read completion data portion in an external storage location associated with the memory device address containing the individual read completion data portion; and outputting an individual read completion data portion from the memory device to an external device.

15 Claims, 2 Drawing Sheets

METHOD AND APPARATUS TO COMBINE SCATTERED BUFFER ADDRESSES INTO A CONTIGUOUS VIRTUAL ADDRESS SPACE

BACKGROUND OF THE INVENTION

This invention relates generally to computer technologies, and more particularly to providing a method and apparatus to combine scattered buffer addresses into a contiguous virtual address space.

A computer system typically includes a processor, a chipset, a main memory and a number of peripheral components. Data may be transferred between the processor, the main memory and the peripheral components within a computer system. Typically, data is transferred between the main memory and other components within the computer system via a memory controller hub of the chipset. Read requesters, such as peripheral components, request data from the main memory or other computer components; these requests for data are commonly called read requests. Each read request retrieves a cache of data, often called a read completion, from the main memory.

Due to innovations in computer technologies, such as high-speed microprocessors running at 10 GHz, the existing parallel input/output interconnect, Peripheral Component Interconnect ("PCI") developed over ten years ago can no longer meet the demands for high speed and bandwidth. To cope with the demands for high speed and bandwidth, serial input/output interconnect has been developed. The latest serial input/output interconnect is Peripheral Component Interconnect Express™ ("PCI Express™" is a trademark of the PCI-Special Interest Group), which is the third generation of input/output interconnect. PCI Express™ is a high-speed serial interconnect, capable of sending multiple read completions for one read request. On PCI Express™, a large read request to retrieve data from the memory results in a large read completion which then may be divided into a plurality of smaller read completions. Each read completion returns data that partially satisfies the read request.

Inbound read completion data for a plurality of outstanding PCI Express™ read requests can be completed in any order in reference to the individual reads, but each read completion of the individual read request must be completed in order. As mentioned above, these read completions can be broken into multiple smaller read completions delivered to their destinations at varying time intervals. The data contained in each read completion must be combined at the destination and delivered as a single chunk of memory to the application layer requester, e.g., the peripheral component.

A typical approach to outputting the read completion data is to handle one read completion at a time. In other words, when the memory controller hub of the chipset receives a read completion, it waits until a PCI Express™ port is not busy to send the read completion via the PCI Express™ port to the read requester. Read completions are sent via the PCI Express™ port one at a time at a fixed size, even though multiple read completions can be combined into one larger completion. The former approach is adopted because it is simple and fair between multiple requesters. However, this approach is very inefficient because the bandwidth of the PCI Express™ port is not fully utilized, leading to decreases in data output efficiency.

One current solution involves reserving a corresponding amount of space in a buffer for each read request before issuing the request. The drawback of this option is that requests cannot be sent until there is enough contiguous address space in the potentially highly fragmented memory space of the buffer, which increases latency for all requests, in particular larger requests.

Another current solution is to create a linked list of buffer addresses as read completion data arrives so the data can be read out in order. When the data is read out to the read requester, the first data portion includes a link including directions to the next data potion. In this way, the read completion data may be broken into small components and stored throughout a fragmented memory space. However, a drawback of this option is that there is no ability to access any particular portion of the originally requested data at any time without first walking through the list to find the link to the location where that portion of the read data is stored.

It would be desirable/advantageous to be able to store read completion data in various locations throughout a buffer and to be able to retrieve any particular portion of the read completion data at any time without having to first walk through a linked list.

BRIEF SUMMARY OF THE INVENTION

An exemplary embodiment includes receiving a plurality of read completion data portions corresponding to a single read request, storing the plurality of read completion data portions in a memory device such that an individual read completion data portion is stored in an individual address of the memory device, storing a valid indicator for a memory device address which contains the individual read completion data portion in an external storage location, storing a tag indicator associated with the read request for the individual read completion portion in an external storage location associated with the memory device address containing the individual read completion data portion, storing a sequence number associated with an individual read completion data portion in an external storage location associated with the memory device address containing the individual read completion data portion; and outputting an individual read completion data portion from the memory device to an external device.

Another exemplary embodiment includes an apparatus comprising: an output port configured to transmit a read request from a requester, a memory interface configured to receive the read request and output a plurality of read completion packets, and a scattered buffer management module configured to receive, store and output the plurality of read completion packets, wherein the scattered buffer management module comprises: a buffer including a plurality of buffer addresses, wherein each buffer address is configured to store an individual read completion data portion of the plurality of read completion data packets, a write interface logic module configured to store a valid indicator corresponding to each individual read completion data portion stored in the buffer, configured to store a tag indicator corresponding to the read request for each read completion data portion, and also configured to store a sequence number associated with each individual read completion data portion, and a read interface logic module configured to receive a virtual address from an external logic, wherein the virtual address includes a transaction tag corresponding to the tag indicator associated with the read request and the sequence number associated with an individual read completion data portion, and also configured to output the read completion portion corresponding to the virtual address.

A further exemplary embodiment includes a computer-readable storage medium for storing instructions for executing a real-time recommendation service, the real-time recommendation service comprising a method of; receiving a plurality of read completion data portions corresponding to a single read request, storing the plurality of read completion data portions in a memory device such that an individual read completion data portion is stored in an individual address of the memory device, storing a valid indicator for a memory device address which contains the individual read completion data portion in an external storage location, storing a tag indicator associated with the read request for the individual read completion portion in an external storage location associated with the memory device address containing the individual read completion data portion, storing a sequence number associated with an individual read completion data portion in an external storage location associated with the memory device address containing the individual read completion data portion; and outputting an individual read completion data portion from the memory device to an external device.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
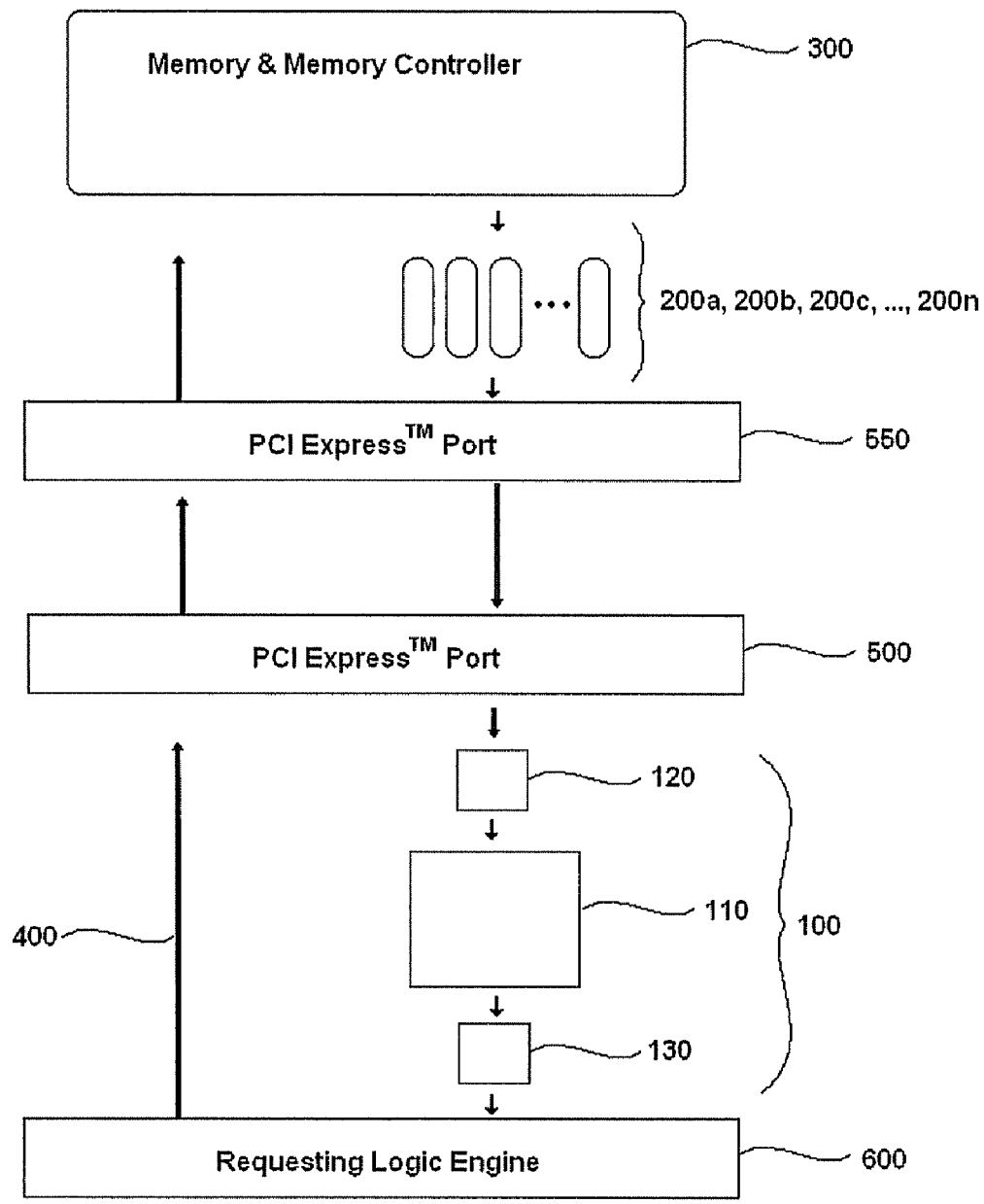
FIG. 1 illustrates buffer management logic according to an example embodiment.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It should be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. An exemplary embodiment of the present invention provides a method for reading and writing buffer information and an apparatus which stores inbound data for a read request into any available buffer location along with tagging information. In the following description, numerous details are set forth, such as specific configurations, data sizes, buffer capacities, etc., in order to provide a thorough understanding of embodiments of the present invention. It will be clear, however, to one of ordinary skill in the art, that these specific details may not be needed to practice every embodiment of the present invention.

Similar to the conventional computer system described above, example embodiments of the present invention may include a processor, a chipset, a main memory and a number of peripheral components. Unlike the conventional computer system, example embodiments of the present invention also include a scattered buffer management module.

Referring now to FIG. 1, example embodiments provide an apparatus including a scattered buffer management module 100 including a buffer 110, write interface logic module 120 and read interface logic module 130. The buffer 110 receives inbound data in the form of a plurality of read completion packets 200*a*-200*n*, wherein n is an integer, retrieved from another component of the computer system such as a memory & memory controller 300 as a result of a read request 400. The read request 400 is issued by a requestor, such as a requesting logic engine 600. The read request 400 passes through a first PCI Express port 500 to a second PCI Express port 550. The read request 400 then passes to a memory & memory controller 300.

The read request 400 is input into the memory & memory controller 300 and then read completion packets 200*a*-200*n* are retrieved and output to the second PCI Express port 550. The second PCI Express port 550 then passes the read completion packets 200*a*-200*n* to the first PCI Express port 500. The first PCI Express port 500 then passes the read completion data to the scattered buffer management module 100. In one exemplary embodiment, the read completion packets 200*a*-200*n* may be further subdivided so that each read completion packet 200*a*-200*n* larger than a predetermined size is divided into a plurality of read data portions. The write interface logic module 120 then assigns tag information to incoming individual read data portions before storing them in the buffer 110. In an alternative exemplary embodiment, the read request 400 may be divided into a plurality of read requests before being sent to the memory & memory controller 300.

After the read completion packets 200*a*-200*n* have been stored in the buffer 110 as individual read data portions by the write interface logic module 120, the requesting logic engine 600 may fetch the data associated with the read request 400 through read interface logic module 130. The read interface logic module 130 fetches the data by presenting a transaction tag associated with the read request 400 to the scattered buffer management module 100, as will be discussed in more detail below.

Figure 2:
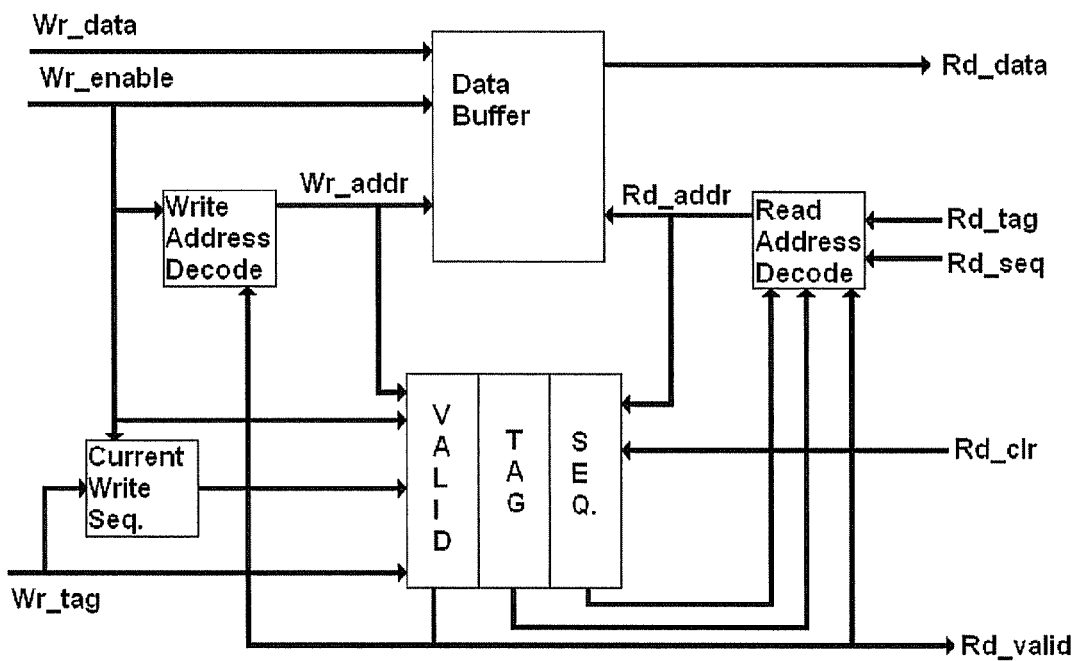
FIG. 2 illustrates buffer management logic according to an example embodiment.

The scattered buffer management module 100 stores the following tag information along with each piece of inbound data to allow for request association and ordering; Valid, Tag and Sequence. The Valid indicator is a single bit indicator of whether a particular buffer address has valid data in it or not. The Tag indicator is an indicator of the particular read request 400 associated with the data in the buffer address. The Sequence indicator is a sequence number associated with the given piece of data, e.g., the first piece of data for the read request 400 may be "0" and may correspond to a first read data portion of the plurality of read completions of the read request 400, the second read data portion associated with the request may be "1", etc., until the final read data portion of the plurality of read completion packets 200a-200n is stored. The tag information, i.e., Valid, Tag and Sequence indicators, may be stored in a tag information buffer as shown in FIG. 2, as will be discussed in more detail below. In the exemplary embodiment wherein the read completion packets 200a-200n are subdivided before entry into the buffer 110, the total number of sequence indicators will be greater than n.

The read interface logic module 130 sorts and orders the individual read data portions into buffer locations based on the tag indicator and the sequence indicator. This sorting and ordering allows the original requestor access to any portion of the originally requested data at any time. An exemplary embodiment of the present invention also allows for a very simple read and write interface to the scattered buffer management module 100.

To make the storage of incoming read completion data as simple as possible, the write interface logic module 120 simply needs to look for the next available buffer entry to store a 16-byte chunk of data. To store a piece of incoming data, the write interface logic module 120 scans the buffer for Valid bit indicators from 0 to M where M is the depth of the buffer, and stores the data into the first Non-Valid location it finds. The associated valid, tag and sequence indicators are stored in a corresponding external storage location and the valid indicator for the location is updated.

With this meta-data for each buffer location, a sorting algorithm can be created to enable a very simple interface between the read interface logic module 130 and an external piece of logic such as the requesting logic engine 600 which wants to get the data out of the buffer 110. When the external piece of logic wants to fetch the data for a read request 400, it simply presents a transaction tag corresponding to the read request 400 to the scattered buffer management module 100 before it wishes to read the data. The scattered buffer management module 100 uses that Tag to sort the buffer locations, by first grouping all of the Valid buffer addresses which have the corresponding Tag indicator into a group. It then sorts that group based on the sequence number indicator from 0 to D, where D is the depth of the read request 400 in buffer entries. Along with the transaction tag, the external logic also presents the sequence number of the data it wishes to fetch. The transaction tag and sequence number together make a virtual address for the location of the desired read data portion within the buffer 110. The sorting of the group allows for a real buffer address associated with a particular data portion to be determined. This real buffer address is then presented to the buffer 110 which outputs the data to the requesting logic engine 600.

The real buffer address associated with the desired virtual address, e.g., transaction tag and sequence number, is then presented to the buffer 110 and the Valid indicator is presented to the requesting logic engine 600 to indicate data is ready to be read. The data is then read out to the requesting logic engine 600 through the read interface logic module 130, without that requesting logic engine 600 ever having to know the real buffer address the read data portion was stored in.

An exemplary embodiment of buffer management logic according to the present invention is described in more detail with respect to FIG. 2. As shown in FIG. 2, a plurality of write signals such as a data writing signal "Wr_data", a data enable signal "Wr_enable" and a tag writing signal "Wr_tag" are sent to the write interface logic module, which in this exemplary embodiment includes a Current Write Sequence logic module, a Write Address Decode logic module and a tag information buffer.

In operation, when the Wr_enable signal is high, data, such as a portion of a read completion packet, is entered into the data buffer. The data is entered into a buffer address as determined by the Write Address Decode logic module. The Write Address Decode logic module receives a valid indicator vector signal from the tag information buffer indicating which addresses in the data buffer are valid. The Write Address Decode logic module then enters the data in the first available data buffer entry. The Wr_enable signal also triggers the Current Write Sequence logic module to register a new sequence number for the given Wr_tag; e.g., if the Current Write Sequence logic module had previously registered "0", it would register "1" after receiving the Wr_enable signal for the indicated Wr_tag sequence number counter. A Wr_tag signal corresponding to the read request for the read completion data is transmitted with the Wr_data signal. The Wr_tag signal triggers the Current Write Sequence logic module to send the current sequence number to the tag information buffer and the Wr_tag signal itself is sent to the tag information buffer.

In the current exemplary embodiment, the read interface logic module includes a Read Address Decode logic module and a tag information buffer. In order to read data out of the data buffer, a requestor (not shown) presents a tag reading signal "Rd_tag" and a sequence reading signal "Rd_seq" signal to the Read Address Decode logic module. The tag reading signal Rd_tag and the sequence reading signal "Rd_seq" together form a virtual address. The Read Address Decode logic module sends a read address "Rd_addr" signal to data buffer instructing the data buffer to output the data in a particular real data buffer address as decoded by the Read Address Decode logic module using vectors from the tag information buffer. The vectors from the tag information buffer include: a valid indicator vector signal indicating which real buffer addresses are occupied with valid data; a tag indicator vector signal indicating the transaction tags associated with each real buffer address; and a sequence number vector signal indicating the sequence numbers for the data portion located in each real buffer address. The Read Address Decode logic module first sorts the real buffer addresses into a group based on the tags corresponding the Rd_tag input and the valid indicator vector. The Rd_seq input is then used to match the requested virtual address to the real address from the remaining group having the same sequence number.

Once the Read Address Decode logic module has determined the real buffer address corresponding to the presented virtual address, it presents the real buffer address to the data buffer and the tag information buffer. A read valid "Rd_valid" signal is sent by the tag information buffer to the requester to indicate that the data is ready to be read from the data buffer. The data buffer then outputs a data read "Rd_data" signal containing the data stored in the real buffer address presented by the read decode logic module, which corresponds to the tag and sequence identifiers sent via the Rd_tag and Rd_seq signals from the requestor.

Once the requester has received the desired data from the data buffer, the process may repeat until all of the data corresponding to a read request has been read out of the data buffer. Additionally, the requester may clear information from the data buffer by sending a read clearing "Rd_clr" signal to the tag information buffer. The Rd_clear signal changes the valid indicator for a particular buffer address from valid to invalid. Therefore, the corresponding entry in the data buffer may be written over during the next write sequence. However, if the Rd_clr signal is not issued by the requester, the data will remain in the data buffer address. This is especially useful when several requestors require the same data, or the same requester requires the data on more than one occasion.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method comprising:
receiving a plurality of read completion data portions corresponding to a single read request;
storing the plurality of read completion data portions in a memory device such that an individual read completion data portion is stored in an individual address of the memory device;
storing a valid indicator for a memory device address which contains the individual read completion data portion in an external storage location;
storing a tag indicator associated with the read request for the individual read completion portion in an external storage location associated with the memory device address containing the individual read completion data portion;
storing a sequence number associated with an individual read completion data portion in an external storage location associated with the memory device address containing the individual read completion data portion; and
outputting an individual read completion data portion from the memory device to an external device, the outputting an individual read completion data portion comprising:
receiving a virtual address from an external logic, wherein the virtual address includes a transaction tag corresponding to the tag indicator associated with the read request and the sequence number corresponding to the individual read completion data portion;
grouping a plurality of read completion data portions stored in the memory device having a valid indicator active and the same tag indicator into a group;
sorting the group based on the sequence number associated with each individual read completion data portion of the plurality of read completion data portions;
presenting an associated real buffer address for the received virtual address to the memory device; and
outputting the read completion data corresponding to the virtual address to the external logic.

2. The method according to claim 1, wherein the receiving, grouping, sorting and outputting repeat until all of the plurality of read completion data portions corresponding to a single read request are output to the external logic.

3. The method according to claim 1, further comprising:
switching the valid indicator from valid to invalid for a memory device address corresponding to the output read completion data portion.

4. The method according to claim 1, wherein the tag indicator associated with each individual read completion data portion of the plurality of read completion data portions corresponding to the single read request is the same.

5. The method of according to claim 1, wherein each read completion data portion is 16 Bytes.

6. The method according to claim 1, wherein the memory device is a memory buffer having a plurality of buffer addresses.

7. The method according to claim 6, wherein the valid indicator is stored as a single bit.

8. An apparatus comprising:
an output port configured to transmit a read request from a requester;
a memory interface configured to receive the read request and output a plurality of read completion packets; and
a scattered buffer management module configured to receive, store and output the plurality of read completion packets,
wherein the scattered buffer management module comprises:
a buffer including a plurality of buffer addresses, wherein each buffer address is configured to store an individual read completion data portion of the plurality of read completion data packets;
a write interface logic module configured to store a valid indicator corresponding to each individual read completion data portion stored in the buffer, configured to store a tag indicator corresponding to the read request for each read completion data portion, and also configured to store a sequence number associated with each individual read completion data portion; and
a read interface logic module configured to receive a virtual address from an external logic, wherein the virtual address includes a transaction tag corresponding to the tag indicator associated with the read request and the sequence number associated with an individual read completion data portion, and also configured to output the read completion portion corresponding to the virtual address.

9. The apparatus of claim 8, wherein the output port is a PCI Express™ port.

10. The apparatus of claim 8, wherein each of the buffer addresses is 16 Bytes.

11. The apparatus of claim 8, wherein the read interface logic module is further configured to remove the valid indicator from a memory device address corresponding to the output read completion packet.

12. The apparatus of claim 8, wherein write interface logic module comprises:
 a current write sequence logic module configured to receive a tag indicator signal and a write data enable signal;
 a write address decode logic module configured to receive a write data enable signal and a valid indicator vector from a tag information buffer; and
 a tag information buffer configured to receive a write address signal from the write address decode logic, a write tag signal from an external source and a sequence signal from the current write sequence logic module.

13. The apparatus of claim 8, wherein the read interface logic module comprises:
 a read address decode logic module configured to receive a virtual address signal from an outside logic module and a valid indicator vector signal, a tag indicator vector signal and a sequence indicator vector signal from the tag information buffer.

14. The apparatus of claim 13, wherein the virtual address signal from the outside comprises a read tag signal and a read sequence signal.

15. A computer program product comprising:
 a non-transitory computer-readable storage medium for storing instructions for executing a method comprising:
 receiving a plurality of read completion data portions corresponding to a single read request;
 storing the plurality of read completion data portions in a memory device such that an individual read completion data portion is stored in an individual address of the memory device;
 storing a valid indicator for a memory device address which contains the individual read completion data portion in an external storage location;
 storing a tag indicator associated with the read request for the individual read completion portion in an external storage location associated with the memory device address containing the individual read completion data portion;
 storing a sequence number associated with an individual read completion data portion in an external storage location associated with the memory device address containing the individual read completion data portion; and
 outputting an individual read completion data portion from the memory device to an external device, the outputting an individual read completion data portion comprising:
 receiving a virtual address from an external logic, wherein the virtual address includes a transaction tag corresponding to the tag indicator associated with the read request and the sequence number corresponding to the individual read completion data portion;
 grouping a plurality of read completion data portions stored in the memory device having a valid indicator active and the same tag indicator into a group;
 sorting the group based on the sequence number associated with each individual read completion data portion of the plurality of read completion data portions;
 presenting an associated real buffer address for the received virtual address to the memory device; and
 outputting the read completion data corresponding to the virtual address to the external logic.

* * * * *